Dec. 1, 1925.
T. W. MEIKLEJOHN
AUTOMOTIVE VEHICLE
Filed May 11, 1925
1,564,090
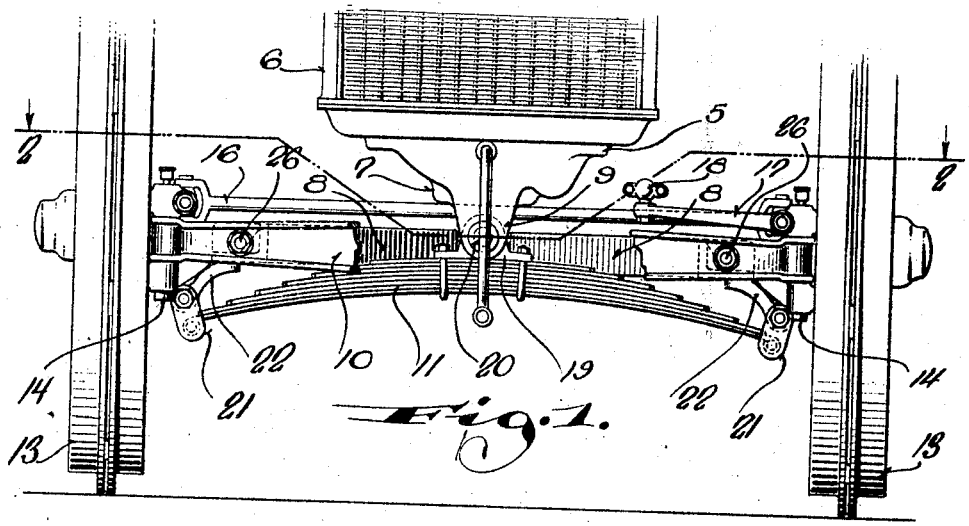
Fig. 1.
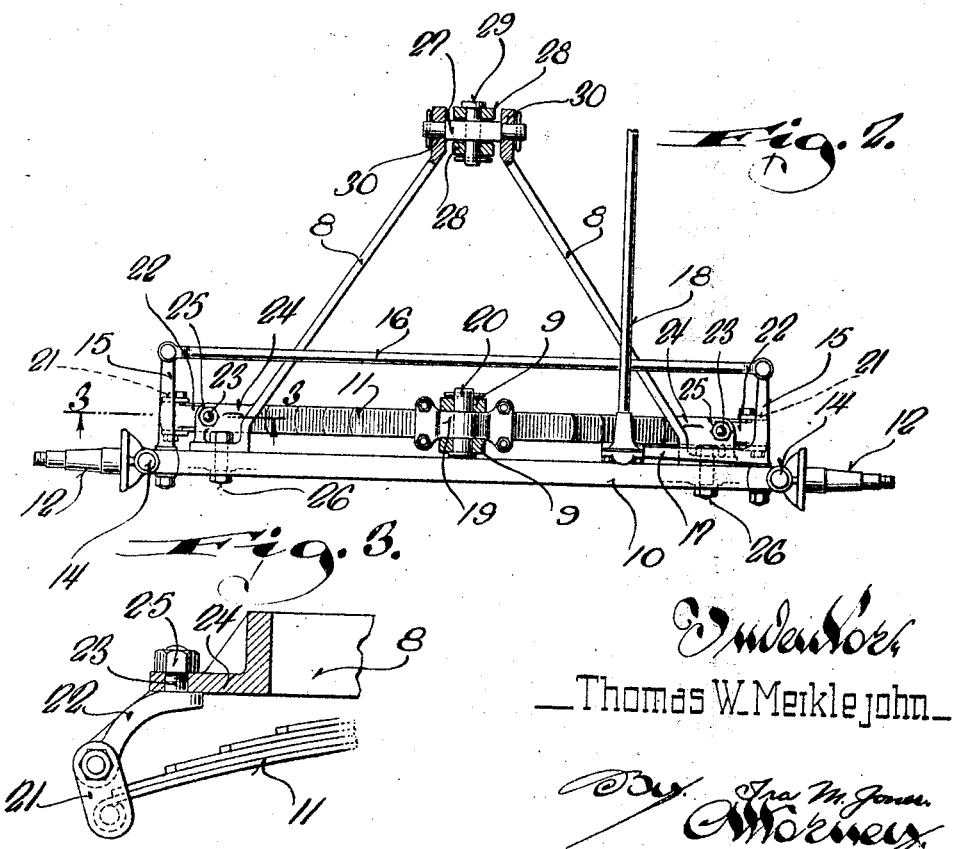
Fig. 2.
Fig. 3.
Thomas W. Meiklejohn Patented Dec. 1, 1925.

1,564,090

UNITED STATES PATENT OFFICE.

THOMAS W. MEIKLEJOHN, OF FOND DU LAC, WISCONSIN.

AUTOMOTIVE VEHICLE.

Application filed May 11, 1925. Serial No. 29,454.

*To all whom it may concern:*

Be it known that I, THOMAS W. MEIKLEJOHN, a citizen of the United States, and resident of Fond du Lac, in the county of Fond du Lac and State of Wisconsin, have invented new and useful Improvements in Automotive Vehicles, of which the following is a description, reference being had to the accompanying drawing, which is a part of this specification.

This invention relates to certain new and useful improvements in automotive vehicles and refers more particularly to an attachment especially designed for use in connection with the conventional type of tractor in which the motor frame or housing is directly, pivotally connected with the front axle, and, as a result, all shocks incident to the passage of the front wheels over the ground are directly imparted to the motor, materially shortening its life and necessitating frequent repairs and replacements.

It is, therefore, an object of my invention to provide an improved spring construction which may be readily applied to tractors either at the time of their manufacture or to the tractors now in use without necessitating any special tools or special parts other than those constituting the attachment.

It is another object of this invention to provide an improved spring attachment for the forward axle of a tractor which will be very durable and which will relieve the radiator and other parts from unnecessary shocks.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a view looking at the front end of a tractor equipped with my invention, the medial portion of the axle being broken away in order to illustrate structural details;

Figure 2 is a top plan view of the front axle assembly, parts being broken away and in section and said view being taken through Figure 1 on the plane of the line 2—2, and Figure 3 is an enlarged, fragmentary, detail view illustrating the manner of suspending the ends of the springs from the brace or radius rods, said view being taken through Figure 2 on the plane of the line 3—3.

Referring now more particularly to the accompanying drawing, in which like numerals designate like parts throughout the several views, the numeral 5 designates the front portion of the crank case or body frame 7 of a tractor to which the usual radiator 6 is suitably secured. The engine, not shown, is also mounted on the body frame and its crank case provides means of attachment, in the manner later described, for the rear ends of two radius or brace rods 8.

Formed on the forward end of the tractor frame are two, spaced, depending lugs 9 between which, in the conventional tractor, the front axle 10 is pivotally secured by a trunnion pin, not shown. In this invention, my improved attachment contemplates the interposing of a spring 11 between the tractor proper and the front axle to absorb shocks and vibrations and thus protect the tractor parts against damage.

The front axle 10 has the spindles 12 of steering wheels 13 connected with its ends by pivot spindle pins 14 from which extend steering arms 15 connected by a steering rod 16. One steering arm has a lever 17 formed thereon to which the forward end of a steering drag link 18 is connected, the link 18 being connected at its rear with the usual steering gear, not shown.

The spring 11 is of the leaf type and has a saddle 19 medially fixed thereto which is pivotally secured between the lugs 9 of the tractor frame by a trunnion pin 20. Each end of the spring is pivotally secured between a pair of spring hangers or shackles 21 which are pivotally suspended from a spring perch 22 mounted on the forward end 24 of the adjacent radius rod. The forward ends of the radius rods are formed with lateral and vertical lugs, the former having the stud bolts 23 formed on the inner ends of the perches passed therethrough and secured thereto by binding nuts 25. The vertical lugs on the forward or outer ends of the radius rods are bolted, or otherwise secured to the adjacent end portions of the axle, as at 26.

The rear ends of the radius rods are universally pivotally connected with the crank case of the tractor by a universal block 27 pivoted between lugs 28 depending from the crank case by a radius rod pin 29 and to the ends of which the rear end portions of the radius rods are pivotally connected, as at 30.

In equipping a tractor with my improved attachment, the tractor forward end is suspended in any suitable manner and the trunnion pin, not shown, securing the axle between the frame lugs 9 is removed as well as the original radius rods and steering drag link. The old radius rods are then replaced by the radius rods illustrated in the drawings, and a slightly longer steering drag link is provided to accommodate the forward shifting of the axle, when the spring 11 is secured in place as illustrated. The attachment maintains the tractor at approximately the same height, but improves its riding qualities, as vibrations and shocks are absorbed by the spring 11, as will be readily apparent.

What I claim as my invention is:

1. In a tractor, the combination with its frame and front supporting axle, of means for supporting the frame from the axle, comprising a pair of brace rods connected at their forward ends with the axle adjacent its ends and converging rearwardly, means connecting the rear ends of the brace rods with the frame, a spring, means connecting the medial portion of the spring with the tractor frame, spring perches carried by the forward ends of the brace rods, and shackle members connecting the ends of the spring with said perches.

2. In a tractor, the combination with its frame and front supporting axle, of means for supporting the frame from the axle, comprising a pair of brace rods connected at their forward ends with the axle adjacent its ends and converging rearwardly, means connecting the rear ends of the brace rods with the frame, a spring, means pivotally connecting the medial portion of the spring with the tractor frame, spring perches carried by the forward ends of the brace rods, and shackle members connecting the ends of the spring with said perches.

3. In a tractor, the combination with its frame and front supporting axle, of means for supporting the frame from the axle, comprising a pair of brace rods, lateral and vertical lugs on the forward ends of the brace rods, means securing the vertical lugs of the rods to the axle, means connecting the rear ends of the brace rods with the frame, a spring, means connecting the medial portion of the spring with the tractor frame, and means pivotally suspending the ends of the spring from the lateral lugs of the brace rods.

4. An attachment for tractors of the "Fordson" type, comprising a pair of brace rods converging rearwardly, a universal block connecting the rear ends of the brace rods for connecting the same with a tractor, laterally extending projections on the forward end portions of the brace rods, spring perches carried by said brace rod projections, a transverse spring extending across the forward ends of the brace rods, means connecting the ends of the spring with the adjacent spring perches, and means carried by the medial portion of the spring for connecting the same with the tractor frame.

In testimony whereof I affix my signature.

THOMAS W. MEIKLEJOHN.